United States Patent [19]

Dillard

[11] Patent Number: 4,560,839
[45] Date of Patent: Dec. 24, 1985

[54] TELEPHONE JUNCTION BOX

[76] Inventor: John T. Dillard, 455 Fifth Ave., Box 198, Monroe, Oreg. 97456

[21] Appl. No.: 531,394

[22] Filed: Sep. 12, 1983

[51] Int. Cl.$^4$ .............................................. H04M 9/00
[52] U.S. Cl. .................................. 179/81 C; 179/81 R; 179/179; 179/175.1 R; 339/126 R
[58] Field of Search ...................... 179/179, 178, 81 R, 179/2 C, 98, 184, 186, 189 R, 189 D, 81 C, 84 L; 339/36, 37, 198 J; 361/426, 333, 334; 220/DIG. 25

[56] References Cited

U.S. PATENT DOCUMENTS

| | | | |
|---|---|---|---|
| 2,968,689 | 1/1961 | Johnson | 339/198 J |
| 2,987,909 | 6/1961 | Shlank | 339/37 X |
| 3,083,896 | 4/1963 | Cairelli et al. | 232/15 |
| 4,303,296 | 12/1981 | Spaulding | 179/98 X |
| 4,325,701 | 4/1982 | Peters, II et al. | 440/113 |
| 4,388,501 | 6/1983 | Ahuja | 179/84 L X |
| 4,396,119 | 8/1983 | Giolie | 220/DIG. 25 X |
| 4,488,008 | 12/1984 | Dellinger et al. | 179/81 R |

Primary Examiner—James L. Dwyer
Attorney, Agent, or Firm—Eugene M. Eckelman

[57] ABSTRACT

A base member for incoming telephone supply equipment is arranged to be mounted on a building and is associated with a first cover member having key lock engagement therewith so that only telephone authorized personnel can have access to the incoming telephone equipment in the base member. The first cover member has customer access equipment which is exposed through a faceplate thereof for access to the telephone customer, whereby the customer can make connections for his service but in view of the locked arrangement of the first cover member on the base member, access to the incoming telephone equipment cannot be had. A second cover member is arranged for mounting on the assembly of base member and first cover member to protect the assembly from the elements, this second cover member having an unlocked connection to the first cover member for easy removal. The customer access equipment includes circuit indicating lamp means and a plug-in jack.

7 Claims, 3 Drawing Figures

TELEPHONE JUNCTION BOX

BACKGROUND OF THE INVENTION

This invention relates to new and useful improvements in telephone junction boxes.

Under FCC requirements, telephone junction boxes must now provide a type of customer access which allows the customer to install privately owned telephone receivers or other equipment at the place of service. It has thus been necessary to alter hook-up arrangements whereby to provide such customer access. At the same time it is desired to guard equipment to which the customer has no right of access. Devices have heretofore been provided in an attempt to meet the requirements of customer hook-up but such devices are overly expensive to manufacture and furthermore do not provide ample access or workroom for telephone personnel.

SUMMARY OF THE INVENTION

According to the present invention and forming a primary objective thereof, a telephone junction box is provided that meets FCC requirements as to customer hook-up and at the same time is relatively inexpensive to manufacture; it prevents access by the customer to telephone company equipment as required by law; it provides easy access for telephone workmen in the installation and maintenance of telephone company equipment; and it is capable of re-using much of the existing telephone protection equipment.

A more particular object of the invention is to provide a telephone junction box of the type described that utilizes a simplified base member which houses telephone equipment and a pair of removable covers which combine to provide availability to the customer of terminal strips, test lamps, and test jacks, and the necessary concealment of the telephone company equipment from others except authorized telephone company personnel.

In carrying out the objectives of the invention, a base member is employed having means to mount it securely on a building from inside fasteners. This base member is arranged to house incoming telephone dial tone equipment and is associated with a first cover member having a customer access faceplate. This first cover member has locking engagement on the base member in an arrangement to prevent access to the base member and to the telephone company side of the customer access faceplate by the customer. The first cover member has mounting means thereon, however, which expose connecting and test equipment for telephone service lines to the customer. The first cover member has cut-away portions to provide air circulation and exit of moisture from the interior of the housing formed by the base member and cover member. A second or outside cover member is arranged for attachment to the first cover member to protect the assembly from the elements, the second cover member having means allowing its removal by the customer.

The invention will be better understood and additional objects and advantages will become apparent from the following description taken in connection with the accompanying drawings.

DETAILED DESCRIPTION OF A PREFERRED EMBODIMENT

Figure 1:
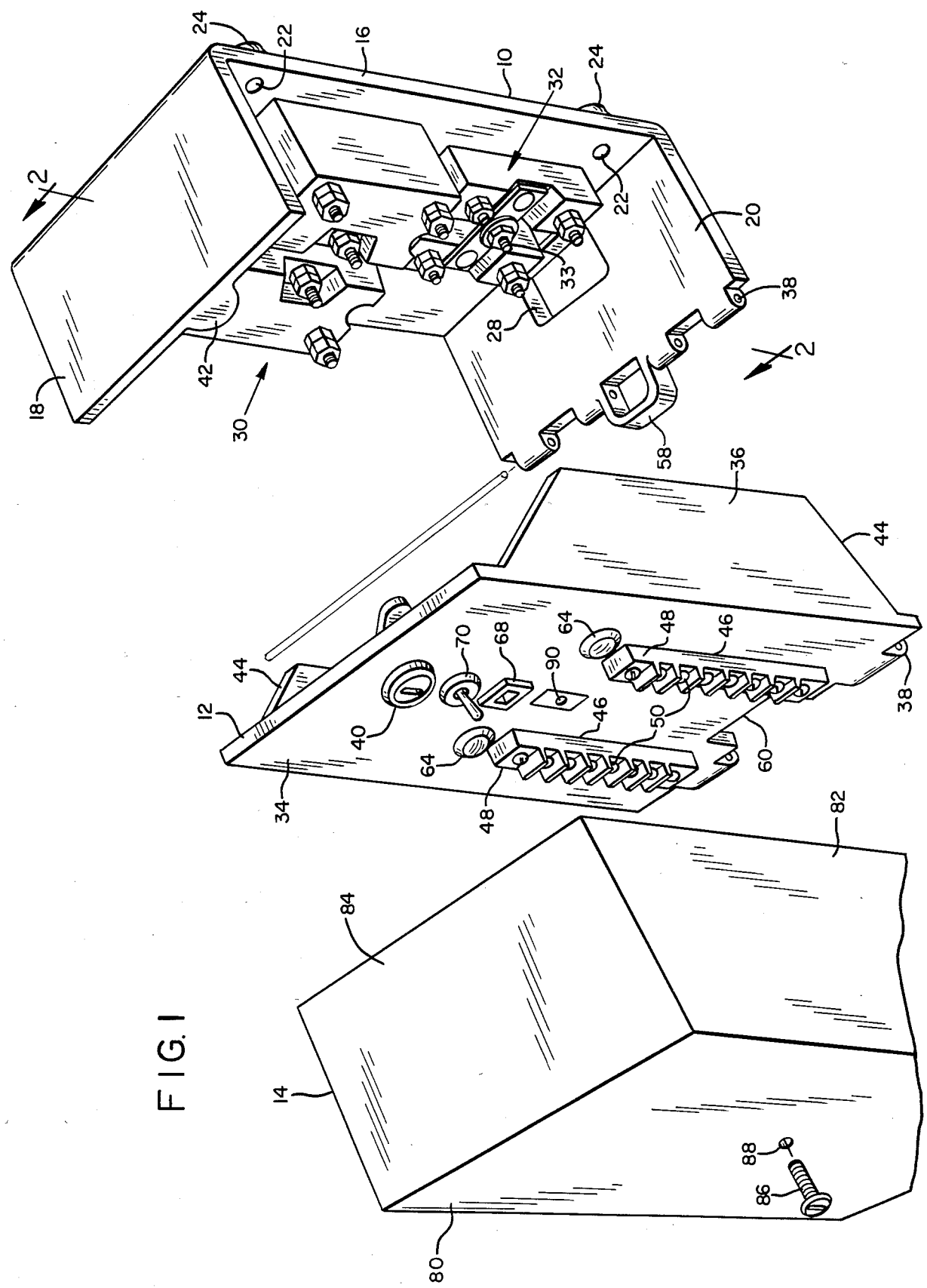
FIG. 1 is an exploded view showing elements of the present telephone junction box.
Figure 2:
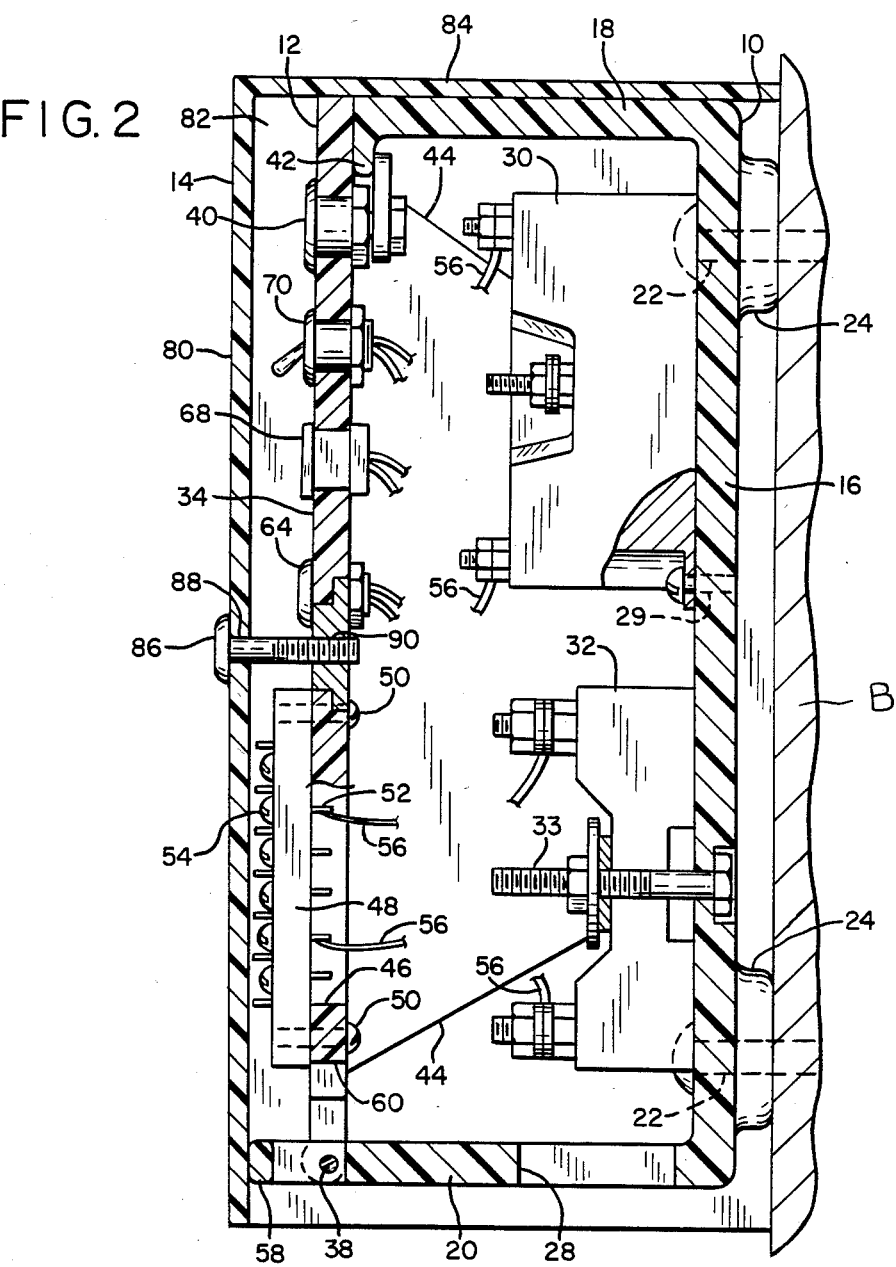
FIG. 2 is an enlarged sectional view taken on the line 2—2 of FIG. 1 with these parts assembled.

The telephone junction box of the invention comprises a base member 10, a first cover member 12 and a second cover member 14. The base member 10 has a rear wall 16 and top and bottom walls 18 and 20, respectively, leading forwardly in a channel shape. Rear wall 16 is arranged to be mounted on the wall of a building B or the like and for this purpose employs screw mounting holes 22 and spacing projections 24. The bottom wall 20 has one or more apertures 28 for receiving telephone incoming line equipment, not shown, for connection to commonly available station electronics 30 and commonly available protective devices 32 and a grounding stud 33 which forms an integral part of the base member. The base member is provided with mounting holes 29 for the telephone company equipment, and series of these holes may be selectively arranged to accommodate various models and makes of such equipment.

The first cover member 12 is arranged to enclose the base member 10 at the front and sides to the extent that the equipment in the base member is not accessible to anyone except authorized telephone company personnel. For such purpose, this cover member has a customer access faceplate 34 and side walls 36 in a channel shape arranged to cover the open front of the base member and the open sides. The bottom end of the cover member 12 and the bottom wall 20 of the base member 10 have connecting hinge means 38 which while connecting the members 10 and 12 together allow the latter to be conveniently opened to provide access to the interior of the base member. The upper end of cover member 12 has a key lock 40 for telephone company personnel arranged for releasable engagement with a depending lip portion 42 on the top wall 16 of the base member 10. This structure allows access by the telephone company but prevents access to the interior of the base member by the customer. The side walls 36 of the cover member 12 have cut away portions 44 at the top and bottom to provide for air circulation in the enclosure formed by members 10 and 12 and also to allow the exit of moisture from the base member.

Faceplate 34 of the first cover member 12 has openings 46 over which one or more screw down barrier terminal strips 48 are secured as by mounting screws 50 leading in from the rear side of the faceplate 34. These terminal strips have terminals 52 projecting rearwardly through the openings 46 and screw connectors 54 on the front for access to the customer. Suitable telephone company circuitry 56 is provided between the interior equipment 30, 32 and the terminal strips 48. The bottom flange 20 of the base member 10 has an apertured projection 58 through which customer wires extend downwardly from the connectors 54, the bottom edge of faceplate 34 having a notch 60 to clear this projection for hinged movement of the cover member 12.

Figure 3:
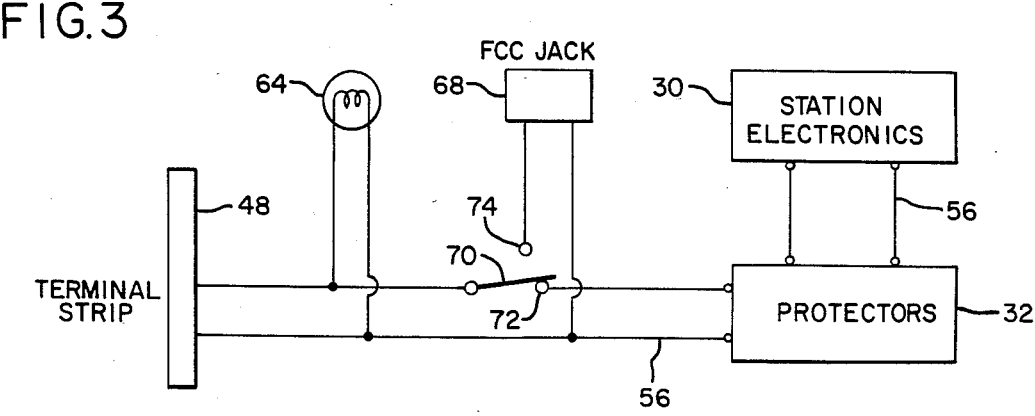
FIG. 3 is a wiring diagram showing test equipment associated with the invention.

Faceplate 34 has status lamps 64 also seen in FIG. 3, suitably and conventionally wired into the equipment for indicating the operability of the circuits. A lamp 64 is provided for each terminal strip 48.

In a preferred structure, and with reference also to FIG. 3, a test FCC jack 68 is provided on the faceplate 34 and is included in the circuitry such that the customer can take a phone to this jack and plug it in to test his or her circuit. That is, if there is a problem with the equipment in the house, such equipment can be tested at the faceplate 34. This not only provides a test for the customer's equipment and circuitry from the junction box to the equipment but it also allows the customer to contact the telephone company for repairs and assistance. Test lamps 64 will indicate whether or not the dial tone exists at the faceplate 34 and from an indication of these lamps and by use of FCC jacks 68, the customer can usually determine the trouble, and call for assistance if needed.

It is preferred that the FCC jack 68 be isolated from the working circuit except during the time it is used for testing, and for this purpose the circuitry 56 of the system to which the jack is connected has a two-way switch 70, FIG. 3, with a normal contact 70 and a test contact 72. The normal contact when engaged by the switch arm provides normal circuitry to the terminal strips 48 and isolates the FCC jack. The test contact 74 when engaged by the switch arm provides circuitry to the FCC jack and opens the circuit to the terminal strips.

The second or outside cover member 14 is arranged to enclose both the base member 10 and cover member 12 and includes a box-like structure having a front wall 80, side walls 82, and a top wall 84, the bottom being open. This cover member is releasably held in place by screw means 86 freely received in a hole 88 in the front wall 60 thereof and threadedly engageable with a tapped bore 90 in the cover member 12.

In the closed position of the parts, the cover member 12 is locked by lock 40 in its upright position on the base member 10 by the telephone company. The open front of the base member is thus closed by the face plate 34 and the open sides thereof are closed by the side walls 36. Although the cut away portions 44 of the side walls 36 allow for circulation of air and exit of moisture, they nevertheless prevent access by unauthorized persons to the telephone company equipment within the base 10. The cover member 14 is large enough to fit or telescope over the connected parts 10 and 12 so as to protect this entire assembly from the elements, including a depth from front to rear to clear the projection 58 and to allow customer installed wires to extend down the exterior surface of the face plate 34 between the connectors 54 and through the apertured projection 58. The open bottom wall of cover 14 allows moisture to escape from the base member and also allows for the desired circulation of air.

When the telephone customer desires to make his or her own connections to the telephone company equipment, as well as to examine the operability of the circuits by test lamps 64 or to use the jack 68, it is only necessary to remove the outer cover member 14. This exposes the terminal strips 48 and other pertinent portions, and the necessary connections or the like can be made. At the same time, the telephone company equipment in the base member 10 is protected from access by the customer.

The specific construction of the base member 10, and the hinged connection of the first cover member 12 provides a simplified and inexpensive structural arrangement. In addition, the specific channel-shaped open front and open side structure of the base member 10 substantially fully exposes the telephone equipment for easy installation, repair, etc. by authorized telephone personnel.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. A telephone junction box comprising
   (a) a base member having a rear wall with front and rear surfaces,
   (b) means on said base member arranged to mount it on a building with said rear surface facing the building,
   (c) means on the front surface of said base member arranged to mount incoming telephone supply equipment,
   (d) a first cover enclosing portions of said base member and having locking engagement with said base member in an arrangement to allow access within said cover and to the front surface of said base member only to authorized telephone company workmen,
   (e) said first cover having a customer access plate with front and rear surfaces,
   (f) mounting means on said first cover arranged to support customer access equipment on the front surface thereof for telephone service lines and arranged to provide connection between the customer access equipment and the incoming telephone supply equipment,
   (g) said mounting means supporting the customer access equipment in exposed position for access by the customer whereby the customer can make connections for service but does not have access to the incoming telephone supply equipment in said base member,
   (h) a second cover enclosing both of said base member and said first cover,
   (i) and means accessible to a customer detachably securing said second cover to the assembly of said base member and said first cover for enclosing said assembly or for gaining access to said customer access equipment on said first cover.

2. The telephone junction box of claim 1 wherein said first cover has cut away portions therein of a size to provide circulation of air and exit of moisture but to prevent unauthorized access.

3. The telephone junction box of claim 1 wherein said base member includes forwardly extending top and bottom walls, the front and sides of said base member being open, said customer access plate being arranged to cover the open front of said base member when in place, said first cover also including side walls arranged to cover the open sides of said base member when in place.

4. The telephone junction box of claim 3 wherein said first cover is hingedly connected adjacent the bottom thereof to a lower portion of said base member and has said locking engagement with said base member adjacent the upper end thereof.

5. The telephone junction box of claim 4 wherein the bottom wall of said base member has an opening through which incoming telephone wires may extend, said second cover including a front wall to cover said customer access plate and also including side walls to cover the side walls of said first cover and a top wall extending over the top wall of said base member, the bottom of said second cover being open to provide clearance for incoming telephone wires extending through said bottom wall of said base member.

6. The telephone junction box of claim 1 wherein said customer access equipment includes lamp means indicating the condition of telephone supply equipment to the service connections for the customer.

7. The telephone junction box of claim 1 wherein said customer access equipment includes a plug-in jack in circuit with telephone supply equipment and arranged for test and emergency use by the customer.

* * * * *